(12) United States Patent
Whitton

(10) Patent No.: US 11,548,433 B2
(45) Date of Patent: Jan. 10, 2023

(54) AUTOMOTIVE DIRECTIONAL DARK AREA PATHWAY ILLUMINATION

(71) Applicant: KARMA AUTOMOTIVE LLC, Irvine, CA (US)

(72) Inventor: Phillip Paul Whitton, Irvine, CA (US)

(73) Assignee: Karma Automotive LLC, Irvine, CA (US)

( * ) Notice: Subject to any disclaimer, the term of this patent is extended or adjusted under 35 U.S.C. 154(b) by 479 days.

(21) Appl. No.: 16/705,880

(22) Filed: Dec. 6, 2019

(65) Prior Publication Data
US 2021/0170939 A1   Jun. 10, 2021

(51) Int. Cl.
*B60Q 1/24*   (2006.01)
*B60Q 1/00*   (2006.01)
(Continued)

(52) U.S. Cl.
CPC ............ *B60Q 1/24* (2013.01); *B60Q 1/0035* (2013.01); *B60R 11/00* (2013.01); *G01S 13/04* (2013.01);
(Continued)

(58) Field of Classification Search
CPC .... B60Q 1/24; B60Q 1/0035; B60Q 2400/40; B60R 11/00; B60R 2011/004;
(Continued)

(56) References Cited

U.S. PATENT DOCUMENTS

| 4,444,496 A * | 4/1984 | Dale, Jr. ............... G01B 11/275 |
| | | 33/228 |
| 2011/0282581 A1* | 11/2011 | Zeng ....................... G01S 17/89 |
| | | 701/301 |

(Continued)

FOREIGN PATENT DOCUMENTS

| DE | 102015011930 A1 * | 3/2017 | ........... B60R 25/245 |
| JP | 2009-057014 A | 3/2009 | |
| JP | WO2019009349 A1 * | 7/2017 | ........... H05B 47/165 |
| KR | 10-2014-0009923 A | 1/2014 | |
| WO | WO-2019009349 A1 * | 1/2019 | ........... B60R 25/245 |

OTHER PUBLICATIONS

International Search Report and Written Opinion dated Mar. 16, 2021 in related International PCT No. PCT/US2020/063634; filed Dec. 7, 2020.

*Primary Examiner* — Marnie A Matt
(74) *Attorney, Agent, or Firm* — Honigman LLP

(57) ABSTRACT

A system for illuminating an area around a motor vehicle, having: a pair of radar systems and a pair of lighting systems mounted on the motor vehicle; a vehicle level sensor configured to detect changes in pitch or roll of the motor vehicle; and an illumination control system in the motor vehicle. The illumination control system includes a key fob communication system and determines the location of a person by detecting the person approaching the motor vehicle by detecting the presence of the key fob while also detecting the location of the person with a radar system mounted on the vehicle. Next, when the location of the person has been determined, the illumination system lights up the area the person is standing while following movement of the person with the radar system to continuously re-directing the illumination towards the location on the ground where the person is standing as the person moves.

19 Claims, 4 Drawing Sheets

(51) Int. Cl.
*B60R 11/00* (2006.01)
*G01S 13/04* (2006.01)
*H04N 5/225* (2006.01)
*G06V 40/16* (2022.01)
*G01S 13/86* (2006.01)
*G01S 13/89* (2006.01)
*G06V 10/141* (2022.01)

(52) U.S. Cl.
CPC .......... *G01S 13/867* (2013.01); *G06V 40/172* (2022.01); *H04N 5/2253* (2013.01); *B60R 2011/004* (2013.01); *G01S 13/89* (2013.01); *G06V 10/141* (2022.01)

(58) Field of Classification Search
CPC ........ G01S 13/04; G01S 13/86; G01S 13/867; G01S 13/87; G01S 13/88; G06V 40/172; G06V 20/56; G06V 40/10; H04N 5/2253
USPC ........................................................ 382/118
See application file for complete search history.

(56) References Cited

U.S. PATENT DOCUMENTS

| | | | |
|---|---|---|---|
| 2014/0016340 A1* | 1/2014 | Cho | F21S 41/19 |
| | | | 362/249.14 |
| 2015/0343945 A1* | 12/2015 | Salter | B60Q 1/26 |
| | | | 315/77 |
| 2015/0353000 A1* | 12/2015 | Kowatzki | B60Q 1/2665 |
| | | | 315/77 |
| 2016/0266243 A1* | 9/2016 | Marron | G01S 7/4865 |
| 2017/0200336 A1* | 7/2017 | Schmidt | G07C 9/00174 |
| 2018/0027634 A1* | 1/2018 | Dalavayi | B60Q 1/24 |
| | | | 315/77 |
| 2018/0065537 A1 | 3/2018 | Abrams | |
| 2019/0054852 A1 | 2/2019 | Wickramashinghe et al. | |
| 2019/0071055 A1* | 3/2019 | Luchner | G01B 11/275 |
| | | | 33/228 |
| 2019/0210563 A1 | 7/2019 | Slovesko | |
| 2020/0340817 A1* | 10/2020 | Schomerus | B60Q 1/50 |

* cited by examiner

AUTOMOTIVE DIRECTIONAL DARK AREA PATHWAY ILLUMINATION

TECHNICAL FIELD

The present invention relates to safety systems for illuminating the area around a motor vehicle.

BACKGROUND OF THE INVENTION

Vehicle illumination safety systems that turn on interior cab lights of a motor vehicle when the vehicle owner is near the vehicle and pushes a button on the vehicle's car fob have been around for years. These lighting systems provide comfort and safety to the vehicle operator as the operator sees the interior of the vehicle prior to stepping into the vehicle. Lighting systems also exist that turn on a vehicle's parking lights or headlights when it has been determined that the car's key fob is near the vehicle. Unfortunately, however, the vehicle operator always approaches a side door of the vehicle and the front lights (or interior cab lights) simply do not provide sufficient illumination of the sides of the vehicle when the operator walks up in the dark. This can become a safety issue since the vehicle operator may be walking towards the vehicle in the dark over uneven, slippery, icy or snow covered ground.

What is instead therefore desired is a system that illuminates the actual path the operator takes when walking towards one of the side doors of the vehicle in the dark. Ideally, such a system would illuminate any of the different paths that the operator may take when walking towards the vehicle, for example, when stepping around objects or obstructions in the dark.

In addition, it would be desirable that the illumination system senses the presence of the vehicle operator either when they are approaching or leaving the vehicle. Ideally, such a system could even recognize the identity of the particular vehicle operator.

It would be most desirable such an illumination could direct lighting that follows the operator's path towards (or away from) the vehicle and illuminate thus the path taken by the vehicle operator. Ideally, the illumination system would have lighting directed primarily towards the operator's feet (so as not to cause glare in the operator's eyes as the operator walks around in the dark). Ideally, such a lighting system would also calculate both the distance and direction the operator is standing away from the vehicle and track the operator's movements. Ideally such a system would also recognize the vehicle owner/operator even if the owner/operator did not have the vehicle's key fob in their possession, or were out of range of the vehicle sensing the presence of the key fob.

As will be shown, the present system addresses these concerns and is ideally suited to meet these objectives.

SUMMARY OF THE INVENTION

The present illumination system first detects the presence of a vehicle operator as the person either leaves the vehicle or approaches the vehicle, and then it provides directed illumination following the path the operator takes moving away from, or towards, the vehicle.

In preferred aspects, the present system for illuminating an area around a motor vehicle, comprises: a pair of radar systems and a pair of lighting systems mounted on the motor vehicle; a vehicle level sensor configured to detect changes in pitch or roll of the motor vehicle; and an illumination control system in the motor vehicle. The illumination control system preferably includes a key fob communication system and the illumination control system determines the location of a person by detecting the person approaching the motor vehicle by detecting the presence of the key fob while also detecting the location of the person with a radar system mounted on the vehicle. Next, when the location of the person has been determined, the illumination system lights up the area where the person is standing. The lighting follows movement of the person with the radar and illumination systems continuously re-directing the illumination towards the location on the ground where the person is standing as the person moves.

In preferred embodiments, each of the pair of lighting systems comprise a segmented lighting array with different segments of the segmented lighting array directing light in different directions. The pair of segmented lighting arrays can be mounted on the front or on the back of the motor vehicle, or both. In addition, the pair of segmented lighting arrays can be mounted on the left or right sides of the motor vehicle.

The pair of radar systems may comprise a radar system mounted on each side of the motor vehicle, or a radar system mounted on the front and back of the motor vehicle, or both. The radar systems are used to identify and track the person moving towards (or away from) either side of the vehicle. The radar system also assists in determining the distance from the vehicle operator to the motor vehicle.

In optional embodiments, the present illumination further comprises: at least one camera mounted on the motor vehicle; and a facial recognition computer system in the illumination control system. The facial recognition computer system receives signals from the at least one camera to determine the identity of the person. Preferably, a pair of cameras (one mounted on either side of the vehicle) is used so as to view the person moving towards (or away from) either side of the vehicle. The radar and/or facial recognition computer systems can also optionally determine the distance from the person to the motor vehicle so as to direct the lighting appropriately as the person's feet.

The present system also includes the method of providing illumination around a motor vehicle, by: (a) determining a location of a person by detecting the person approaching the motor vehicle by detecting the presence of a key fob with a key fob communication system while detecting the location of the person with a radar system mounted on the vehicle; and then (b) illuminating an area on the ground where the person is standing by activating a pair of directional lighting systems; (c) following movement of the person with the radar system; and (d) continuously re-directing the illumination towards the location on the ground where the person is standing as the person moves.

DETAILED DESCRIPTION OF THE DRAWINGS

Figure 1:
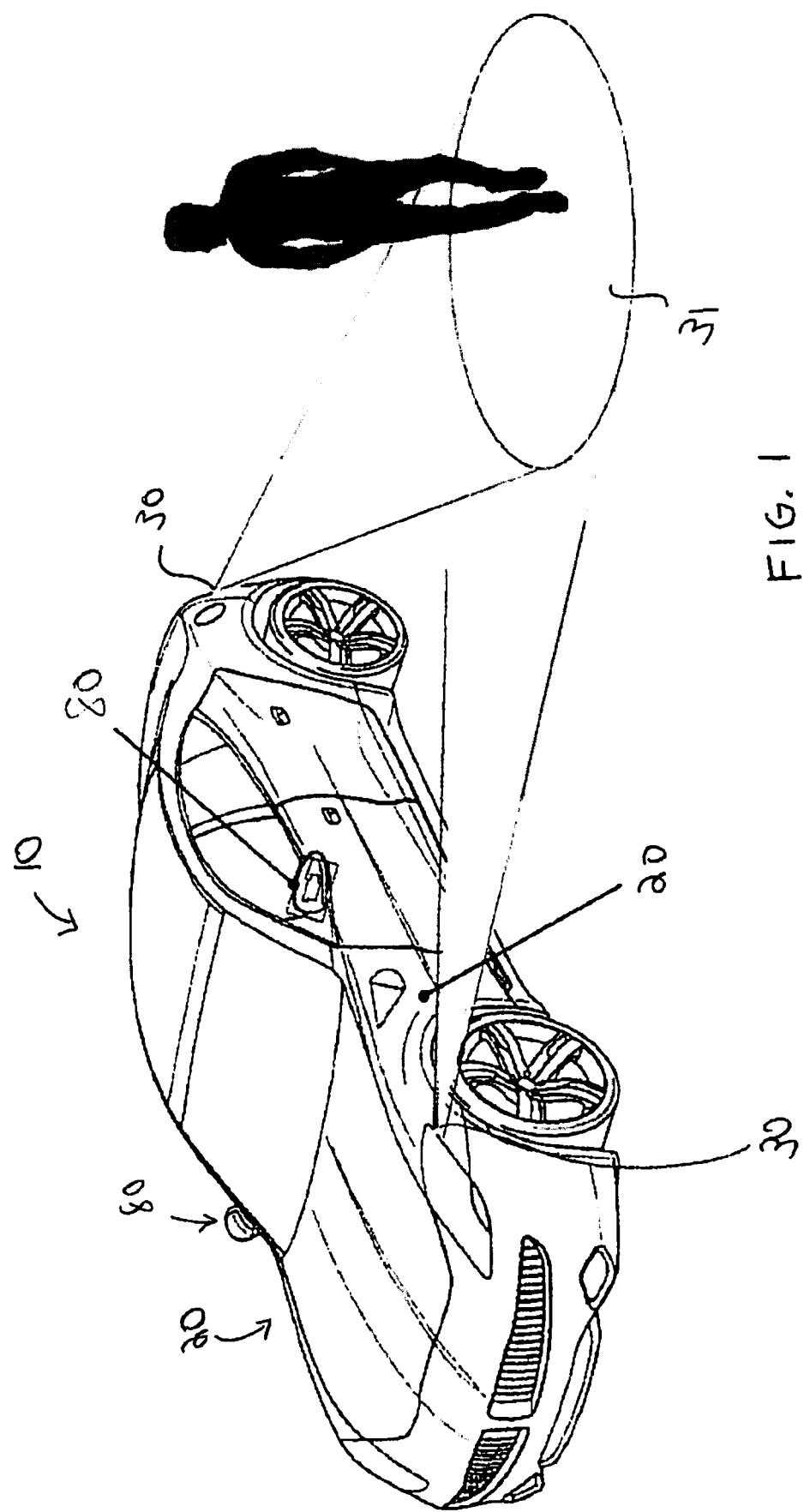
FIG. 1 is an illustration of a person approaching the side of a motor vehicle.

Referring first to FIG. 1, a person is shown approaching the side of motor vehicle 10. The present illumination system comprises: a pair of radar systems 20 mounted on opposite sides of motor vehicle 10, and a pair of lighting systems 30 mounted on the same side of the motor vehicle.

Figure 4:
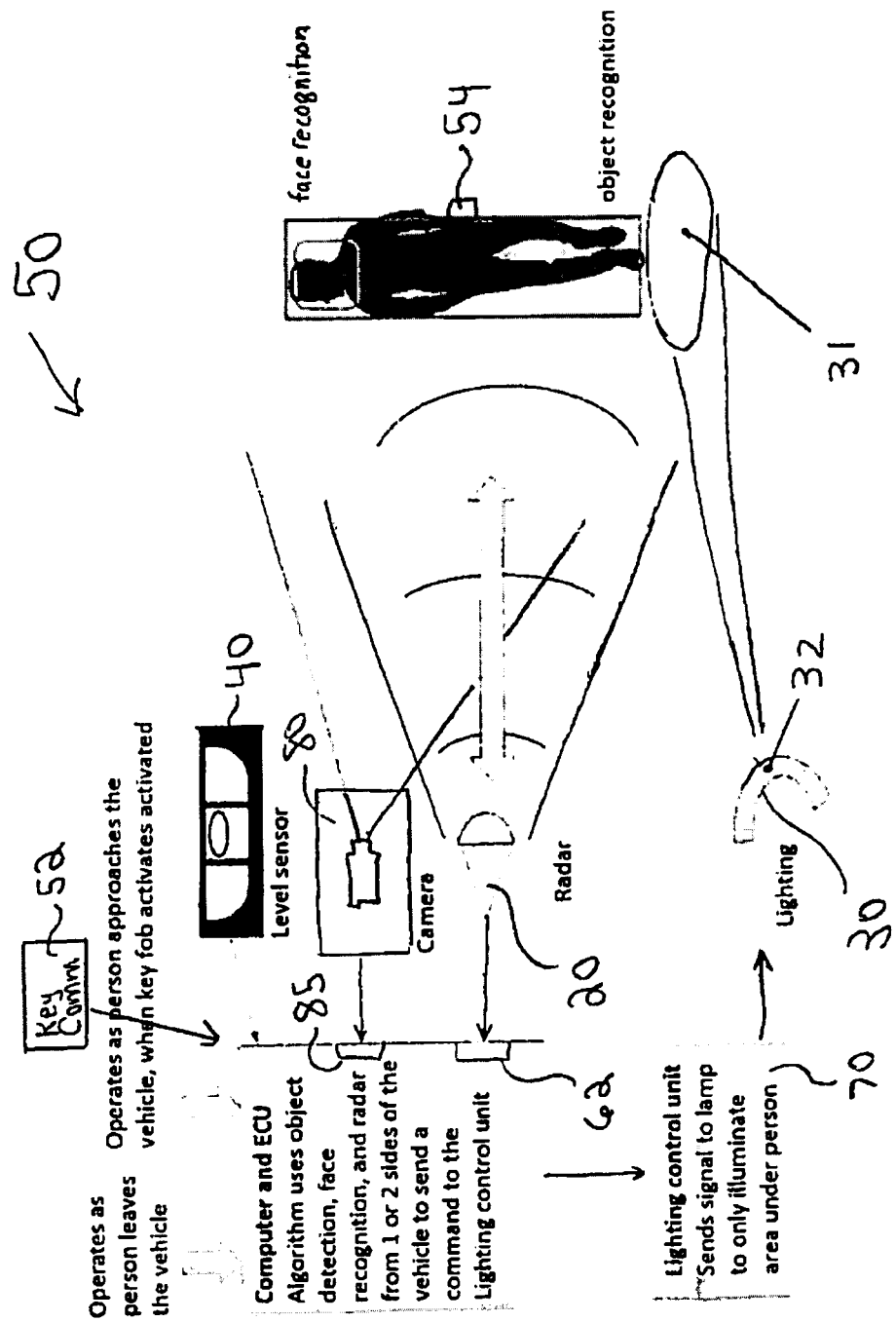
FIG. 4 is schematic illustration of the operation of an exemplary illumination control system in accordance with the present invention.

Included within vehicle 10 is a vehicle level sensor 40 (illustrated in FIG. 4). Vehicle level sensor 40 is configured to detect changes in pitch or roll of motor vehicle. Specifically, vehicle level sensor 40 is configured to detect rotation of the vehicle 10 about either (or both) of axes A1 and A2. When vehicle level sensor 40 detects rotation of 10 about either of axes A1 and A2, the conclusion can be that it works in conjunction with radar to determine ground plan, to optimally project illumination.

Figure 2:
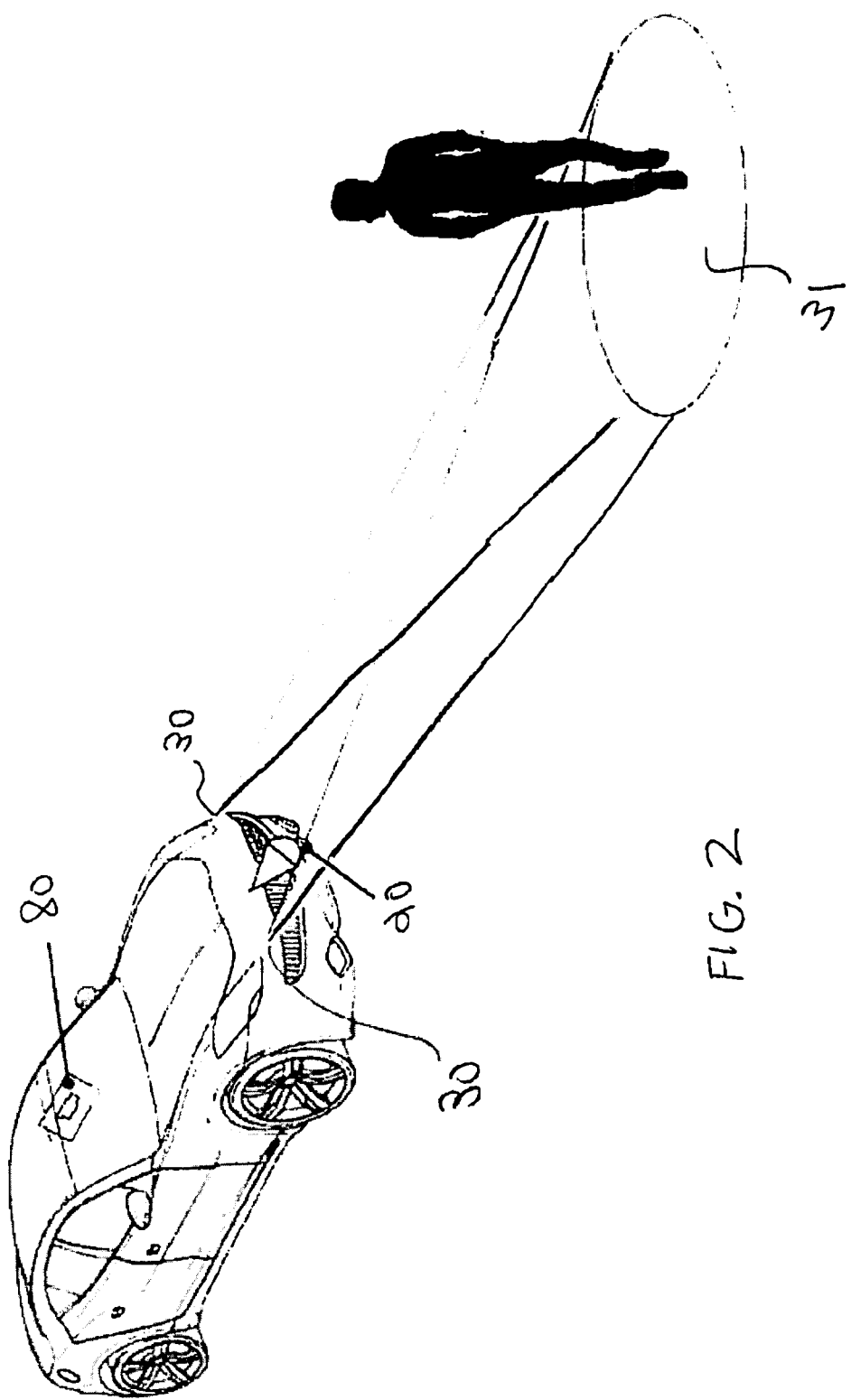
FIG. 2 is an illustration of a person approaching the front of a motor vehicle.
Figure 3:
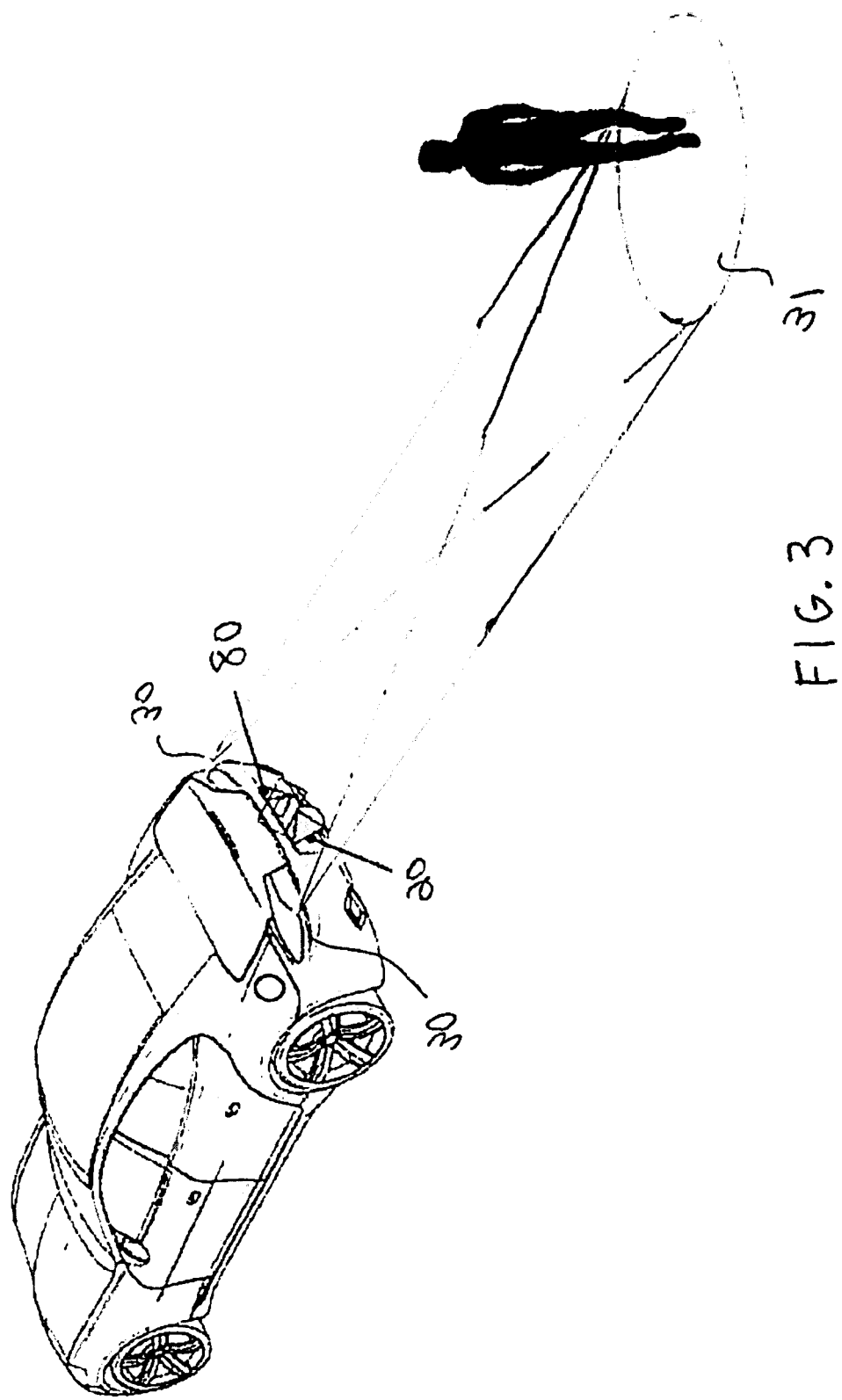
FIG. 3 is an illustration of a person approaching the rear of a motor vehicle.

Various placements for the radar systems 20 and the lighting systems 30 will now be illustrated. FIG. 2 is an illustration of a person approaching the front of motor vehicle 10. In this embodiment, a single radar system 20 is mounted on the front of the vehicle with a pair of lights 30 also mounted on the front of the vehicle. With this arrangement, radar system 20 will be used to detect the presence of the person walking in front of the vehicle. FIG. 3 illustrates a similar arrangement with a single radar 20 and a pair of lights 30 mounted onto the rear of the vehicle. With this arrangement, radar system 20 will be used to detect the presence of the person walking behind the vehicle. It is to be understood that the present system preferably includes both of the placements of FIGS. 2 and 3 together on the same vehicle at the same time.

Similarly, as illustrated in FIG. 1, the radar system 20 and the pair of lights 30 can be positioned on each of the two sides of the vehicle. As can be appreciated, the present illumination system is thereby able to detect and follow an operator approaching from (or walking away towards) each of the four sides of the vehicle.

In preferred embodiments, a pair of lights 30 are preferably used (either on the sides of the vehicle, the front of the vehicle, the back or the vehicle, or any combination thereof) so that lighting of the area where the vehicle operator is standing is provided by two light sources coming from two directions. Note: these overlapping rings of illumination are seen in each of FIGS. 1, 2 and 3. The advantage of using two lighting sources pointing at the operator's feet is that shadows are reduced or eliminated.

In further optional embodiments, the present illumination system also comprises at least one camera 80 mounted on the motor vehicle. Camera 80 preferably comprises the side mounted cameras 80 in FIG. 1 or the front and rear mounted cameras 80 in each of FIGS. 2 and 3. Cameras 80 work together with a facial recognition computer system (85 in FIG. 4). Facial recognition computer system 85 receives signals from the cameras 80 to determine the identity of the person, and may optionally determine the distance the person is from the vehicle as well.

In optional aspects, radar system 20 determines the distance of the person to the motor vehicle, and the illumination system 50 only activates the pair of lighting systems when the person is within a pre-defined distance from the motor vehicle.

In yet other optional aspects, the illumination is activated when the person has been identified by facial recognition system 85 regardless of whether or not the presence of the key fob has been detected. This has the advantage of lighting a path for a recognized vehicle operator even if (s)he is not carrying their keys (for example when walking down the driveway in the dark when putting out garbage cans).

As seen schematically in FIG. 4, the present illumination system also includes an illumination control system 50 that is disposed in internal electrical componentry of motor vehicle 10. Illumination control system 50 comprises: a key fob communication system 52 that receives signals from a key fob 54 to detect the presence of key fob 54 near motor vehicle 10; a radar communication system 62 that receives signals from radar systems 20 to detect the location of a person near the motor vehicle, and a lighting activation system 70 that activates a pair of lighting systems 30 to direct illumination towards the person detected near the motor vehicle. In preferred aspects, lighting activation system 50 continuously re-directs the illumination towards the ground the person is standing on as the person moves. Specifically, the pair of lights 30 on the side of the vehicle illuminate illuminated area 31.

In preferred aspects, the present system also comprises a method of providing illumination around a motor vehicle, comprising: (a) determining a location of a person by detecting the person approaching the motor vehicle by detecting the presence of a key fob 52 with a key fob communication system 50 while detecting the location of the person with a radar 20 system mounted on the vehicle; and then (b) illuminating an area on the ground where the person is standing by activating a pair of directional lighting systems 30; (c) following movement of the person with radar system 20; while (d) continuously re-directing the illumination from lights 30 towards the location on the ground where the person is standing as the person moves.

Preferably, each of the pair of directional lighting systems 30 comprise a segmented lighting array with different segments 32 of the segmented lighting array 30 illuminated at different times so as to direct light in different directions so as to follow the moving path of the vehicle operator. As such, different segments 32 of the segmented lighting array direct light in different directions. By turning different segments 32 on and off, illuminated area 31 moves as the operator walks.

What is claimed is:

1. A system for illuminating an area around a motor vehicle, comprising:
   a motor vehicle;
   a pair of radar systems mounted on the motor vehicle;
   a pair of lighting systems mounted on the motor vehicle;
   a vehicle level sensor configured to detect changes in pitch or roll of the motor vehicle; and
   an illumination control system in the motor vehicle, the illumination control system comprising:
      a key fob communication system that receives signals from a key fob to detect the presence of the key fob near the motor vehicle;
      a radar communication system that receives signals from the pair of radar systems and the vehicle level sensor to detect a location of a person near the motor vehicle and determine a ground plane near the motor vehicle, and
      a lighting activation system that activates the pair of lighting systems to direct illumination towards a ground surface where the location of the person is detected near the motor vehicle based on the determined ground plane.

2. The system of claim 1, wherein the lighting activation system continuously re-directs the illumination towards the person as the person moves.

3. The system of claim 1, wherein each of the pair of lighting systems comprise a segmented lighting array, and wherein different segments of the segmented lighting array direct light in different directions.

4. The system of claim 3, wherein the pair of segmented lighting arrays are mounted on the front or back of the motor vehicle.

5. The system of claim 3, wherein the pair of segmented lighting arrays are mounted on the left or right sides of the motor vehicle.

6. The system of claim 1, wherein the pair of radar systems comprise a radar system mounted on each side of the motor vehicle.

7. The system of claim 1, wherein the pair of radar systems comprise a radar system mounted on the front and the back of the motor vehicle.

8. The system of claim 1, further comprising:
at least one camera mounted on the motor vehicle; and
a facial recognition computer system in the illumination control system, wherein the facial recognition computer system receives signals from the at least one camera to determine the identity of the person.

9. The system of claim 8, wherein the at least one camera comprises a camera mounted on each side of the motor vehicle.

10. The system of claim 8, wherein the radar system determines the distance from the person to the motor vehicle.

11. A method of providing illumination around a motor vehicle, comprising:
(a) determining a location of a person by detecting the person approaching the motor vehicle by detecting the presence of a key fob with a key fob communication system while detecting the location of the person with a radar system mounted on the vehicle; and then
(b) illuminating an area on the ground where the person is standing by activating a pair of directional lighting systems;
(c) following movement of the person with the radar system; and
(d) continuously re-directing the illumination towards the location on the ground where the person is standing as the person moves.

12. The method of claim 11, wherein each of the pair of directional lighting systems comprise a segmented lighting array, and wherein different segments of the segmented lighting array direct light in different directions.

13. The method of claim 12, wherein continuously re-directing the illumination towards the location on the ground where the person is standing as the person moves comprises lighting different segments of the segmented lighting array at different times.

14. The method of claim 11, further comprising:
(e) identifying the person with a camera and a facial recognition system in the illumination control system, and directing the illumination towards the area the person is standing once the person has been identified and the distance the person is from the motor vehicle has been determined by the radar system.

15. The method of claim 14, wherein the illumination is activated when the person has been identified regardless of whether the presence of the key fob has been detected.

16. The method of claim 14, wherein the illumination is activated when the person exits the motor vehicle.

17. The method of claim 11, wherein the radar determines the distance of the person to the motor vehicle, and wherein the illumination system activates the pair of lighting systems when the person is within a pre-defined distance from the motor vehicle.

18. The method of claim 11, wherein illuminating an area on the ground where the person is standing by activating a pair of directional lighting systems comprises activating a pair of lights on one side of the motor vehicle.

19. The method of claim 11, wherein illuminating an area on the ground where the person is standing by activating a pair of directional lighting systems comprises activating a pair of lights on the front or on the back of the motor vehicle.

* * * * *